United States Patent
Lu et al.

(10) Patent No.: US 12,493,841 B2
(45) Date of Patent: Dec. 9, 2025

(54) CONTEXT-AWARE CUEING FOR DAILY INTERACTIONS, NAVIGATION, AND ACCESSIBILITY

(71) Applicant: International Business Machines Corporation, Armonk, NY (US)

(72) Inventors: Fang Lu, Billerica, MA (US); Jana H. Jenkins, Raleigh, NC (US); Jeremy R. Fox, Georgetown, TX (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 18/510,031

(22) Filed: Nov. 15, 2023

(65) Prior Publication Data

US 2025/0156782 A1 May 15, 2025

(51) Int. Cl.
*G06Q 10/0631* (2023.01)
*G06N 3/02* (2006.01)
*H04L 67/306* (2022.01)

(52) U.S. Cl.
CPC ......... *G06Q 10/06316* (2013.01); *G06N 3/02* (2013.01); *H04L 67/306* (2013.01)

(58) Field of Classification Search
CPC .. G06Q 10/063; G06Q 10/06316; G06N 3/02; H04L 67/306
See application file for complete search history.

(56) References Cited

U.S. PATENT DOCUMENTS

| | | | |
|---|---|---|---|
| 5,444,819 A * | 8/1995 | Negishi | G06Q 40/02 706/31 |
| 6,917,952 B1 * | 7/2005 | Dailey | G06F 40/216 707/E17.084 |
| 9,756,604 B1 | 9/2017 | Levesque et al. | |
| 2015/0279366 A1 | 10/2015 | Krestnikov et al. | |
| 2017/0201624 A1 | 7/2017 | Runyan et al. | |
| 2018/0012118 A1 | 1/2018 | Catten et al. | |
| 2019/0000373 A1 | 1/2019 | Boesen et al. | |

(Continued)

OTHER PUBLICATIONS

Bogdan R, Tatu A, Crisan-Vida MM, Popa M, Stoicu-Tivadar L. A Practical Experience on the Amazon Alexa Integration in Smart Offices. Sensors (Basel). Jan. 22, 2021; 21(3):734.*

(Continued)

*Primary Examiner* — Timothy Padot
(74) *Attorney, Agent, or Firm* — Monchai Chuaychoo

(57) ABSTRACT

A method for providing context-aware cueing for daily interactions, navigation, and accessibility is disclosed. In one embodiment, such a method includes receiving routine data describing routine-based tasks associated with a user. The method further receives interaction data describing current interactions of the user in a particular environment. The method processes, using a neural network, the routine data and interaction data to determine a next step to be performed by the user that is consistent with the routine-based tasks and the current interactions. The method provides a cue to the user to perform the next step in the particular environment. This cue may include one or more of a visual, auditory, and haptic cue. The method may continuously refine the neural network to increase the accuracy of the cue. A corresponding system and computer program product are also disclosed.

20 Claims, 9 Drawing Sheets

(56) References Cited

U.S. PATENT DOCUMENTS

| | | | |
|---|---|---|---|
| 2019/0370628 A1* | 12/2019 | Sathaye | G06N 3/006 |
| 2021/0110734 A1* | 4/2021 | May | A61B 5/486 |
| 2021/0158172 A1* | 5/2021 | Chen | G06F 18/24137 |
| 2022/0083908 A1* | 3/2022 | Sharifi | G06F 3/167 |
| 2023/0017367 A1 | 1/2023 | May | |

OTHER PUBLICATIONS

D. Chatzopoulos, C. Bermejo, Z. Huang and p. Hui, "Mobile Augmented Reality Survey: From Where we are to Where we go," in IEEE Access, vol. 5, pp. 6917-6950, 2017.*

R. Sarikaya, "The Technology Behind Personal Digital Assistants: An overview of the system architecture and key components," in IEEE Signal Processing Magazine, vol. 34, No. 1, pp. 67-81, Jan. 2017.*

J. Santos, J. J. P. C. Rodrigues, J. Casal, K. Saleem and V. Denisov, "Intelligent Personal Assistants Based on Internet of Things Approaches, " in IEEE Systems Journal, vol. 12, No. 2, pp. 1793-1802, Jun. 2018.*

P. Mane, S. Sonone, N. Gaikwad and J. Ramteke, "Smart personal assistant using machine learning," 2017 International Conference on Energy, Communication, Data Analytics and Soft Computing (ICECDS), Chennai, India, 2017, pp. 368-371.*

Miller, B., "New Approaches to Context-aware Visualization Systems Target of New Research," McKelvey School of Engineering, available at https://engineering.wustl.edu/news/2022/New-approaches-to-context-aware-visualization-systems-target-of-new-research.html, Mar. 30, 2022.

"Creating Dynamic Visual Cues for User Onboarding Tours," IP.com No. IPCOM000261183D, An IP.com Prior Art Database Technical Disclosure, Feb. 6, 2020.

* cited by examiner

CONTEXT-AWARE CUEING FOR DAILY INTERACTIONS, NAVIGATION, AND ACCESSIBILITY

BACKGROUND

Field of the Invention

This invention relates generally to digital assistants and more specifically to digital assistants for providing context-aware cues for daily interactions, navigation, and accessibility.

Background of the Invention

Digital assistants come in various types, each tailored to meet specific needs and use cases. For example, personal digital assistants, like Siri and Google Assistant, are designed for personal tasks and organization, helping users set reminders, manage schedules, and provide personalized recommendations. Smart speaker assistants, such as Amazon's Alexa and Google Home Assistant, are integrated into smart speakers and serve as home companions, responding to voice commands to control smart home devices, play music, answer questions, and provide news updates.

Another category of digital assistants includes virtual chatbot assistants, which are text-based and commonly found on websites, messaging apps, or customer service platforms. These chatbots can provide automated responses to user inquiries, assist with FAQs, and guide users through various processes. Overall, the purpose of digital assistants is to simplify tasks, improve communication, enhance productivity, and offer personalized assistance in various domains, making daily life more convenient and efficient for users. As artificial intelligence (AI) technology advances, digital assistants are expected to evolve further, taking on more complex tasks and integrating with a wide range of applications and devices.

SUMMARY

The invention has been developed in response to the present state of the art and, in particular, in response to the problems and needs in the art that have not yet been fully solved by currently available systems and methods. Accordingly, systems and methods have been developed for providing context-aware cueing for daily interactions, navigation, and accessibility. The features and advantages of the invention will become more fully apparent from the following description and appended claims, or may be learned by practice of the invention as set forth hereinafter.

Consistent with the foregoing, a method for providing context-aware cueing for daily interactions, navigation, and accessibility is disclosed. In one embodiment, such a method includes receiving routine data describing routine-based tasks associated with a user. The method further receives interaction data describing current interactions of the user in a particular environment. The method processes, using a neural network, the routine data and interaction data to determine a next step to be performed by the user that is consistent with the routine-based tasks and the current interactions. The method provides a cue to the user to perform the next step in the particular environment. This cue may include one or more of a visual, auditory, and haptic cue. The method may continuously refine the neural network to increase the accuracy of the cue.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
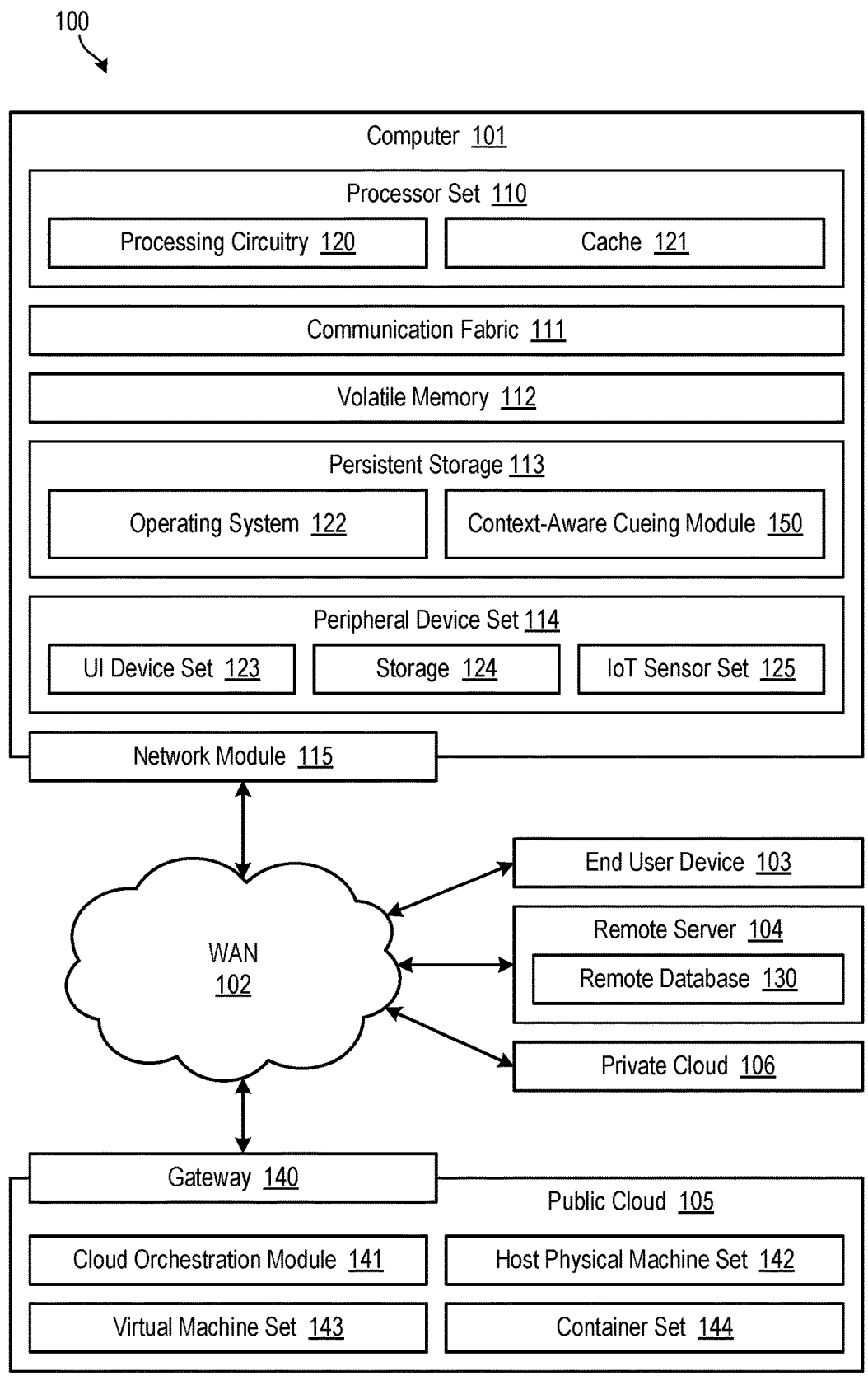
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 (i.e., a "context-aware cueing module 150") for providing context-aware cueing for daily interactions, navigation, and accessibility. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
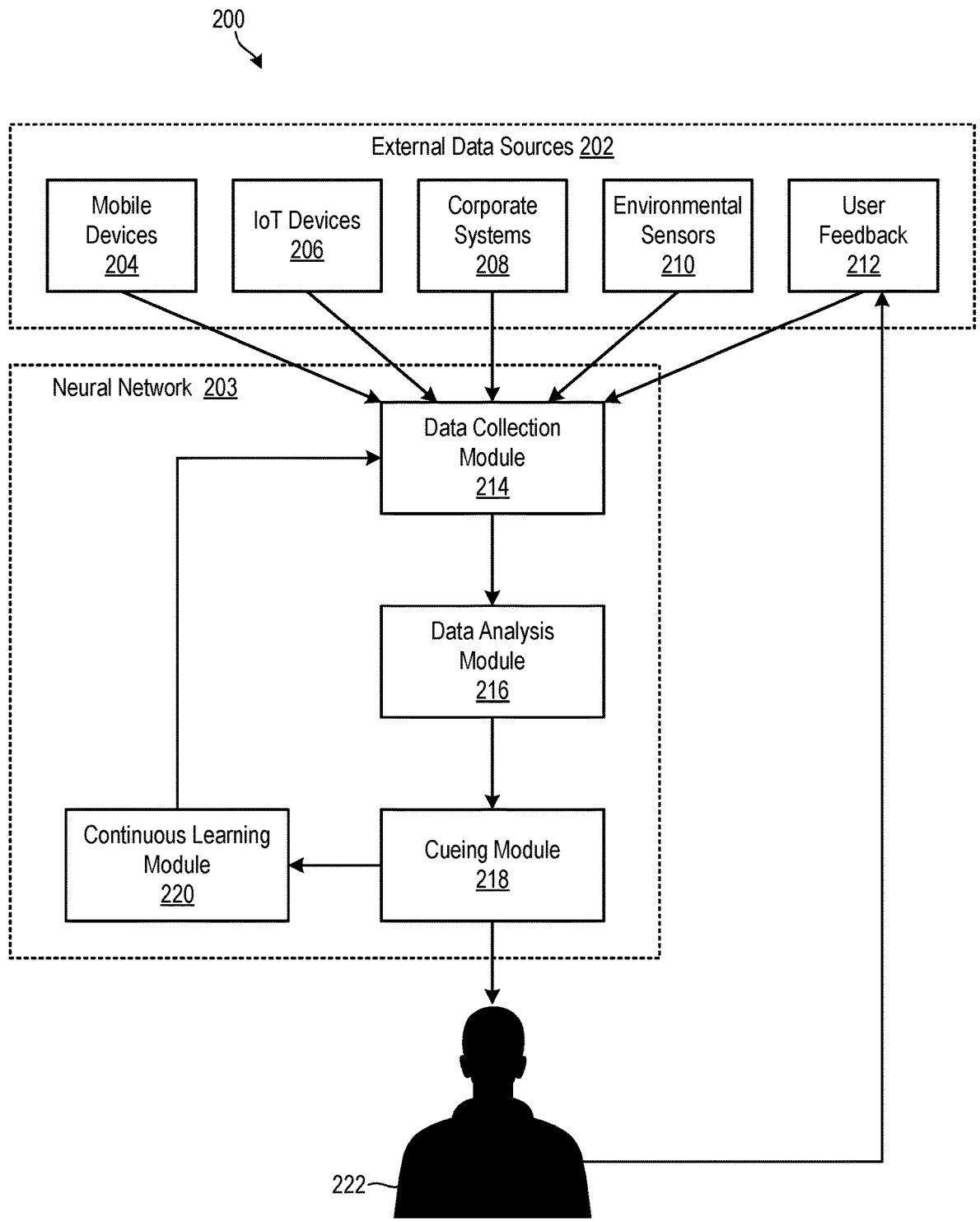
FIG. 2 is a high-level block diagram showing one embodiment of a system for providing context-aware cues for daily interactions, navigation, and accessibility.

Referring to FIG. 2, as previously mentioned, digital assistants come in various types, each tailored to meet specific needs and use cases. For example, personal digital assistants, like Siri and Google Assistant, are designed for personal tasks and organization, helping users set reminders, manage schedules, and provide personalized recommendations. Smart speaker assistants, such as Amazon's Alexa and Google Home Assistant, are integrated into smart speakers and serve as home companions, responding to voice commands to control smart home devices, play music, answer questions, and provide news updates.

Virtual chatbot assistants are another category of digital assistants that are text-based and commonly found on websites, messaging apps, or customer service platforms. These chatbots can provide automated responses to user inquiries, assist with FAQs, and guide users through various processes. Overall, the purpose of digital assistants is to simplify tasks, improve communication, enhance productivity, and offer personalized assistance in various domains, making daily life more convenient and efficient for users. As artificial intelligence (AI) technology advances, digital assistants are expected to evolve further, taking on more complex tasks and integrating with a wide range of applications and devices.

In certain embodiments in accordance with the invention, a new category of digital assistant may be used to help users stay on task and/or guide users through a common or new set of tasks. For example, it would be an advance in the art for a digital assistant to guide a user in real time through a familiar or unfamiliar set of tasks depending on the date, time, and/or the environment in which the user finds him or herself. Ideally, the digital assistant would be aware of the environment in which the user finds him or herself and/or the resources that are available to the user so that proper guidance can be provided and so the user can more effectively and efficiently perform a particular task or set of tasks. One example of such a system 200 is shown in FIG. 2. This system 200 may provide all or part of the functionality of the context-aware cueing module 150 previously discussed.

As shown in FIG. 2, in one embodiment, a system 200 in accordance with the invention may be configured to gather data from various external data sources 202. In general, these external data sources 202 may be used to gather data about a user's routine-based tasks, data describing the current interactions of the user in a particular environment, as well as expected or anticipated accomplished tasks in a current environment or context. This data may be used to build an extensive user profile and train a neural network 203. These external data sources 202 may include, for example, mobile devices 204 (e.g., smartphones, smart watches, tablets. Etc.), Internet-of-Things (IoT) devices 206 (e.g., smart speakers, smart thermostats, smart locks, smart switches, etc.), corporate systems 208 (e.g., calendar applications, project management tools, email clients, etc.), environmental sensors 210 (e.g., motion detectors, cameras, microphones, etc.) and user feedback 212 (e.g., manual inputs, voice commands, preferences, etc.)

The external data sources 202 may be coupled to a data collection module 214 to collect the previously described data. The data gathered by the data collection module 214 may be analyzed by a data analysis module 216 using machine learning algorithms of a neural network 203 to predict or anticipate steps that a user 222 should take in an interaction sequence. Based on this analysis, a cueing module 218 may provide cues, such as visual, audio, or haptic cues to alert users of next steps to perform in an interaction sequence. The cues may be provided through augmented reality glasses, augmented reality headsets, headphones, smart phones, tablets, smart watches, haptic devices, and/or the like. A continuous learning module 220, by contrast, may continuously refine the system 200 to provide increasingly accurate guidance or cues. The continuous learning module 220 may, in certain embodiments, continuously adapt to a user's needs and preferences while also expanding the system's knowledge base.

The modules shown in FIG. 2 may be implemented in hardware, software, firmware, or combinations thereof. The modules are presented by way of example and not limitation. More or fewer modules may be provided in different embodiments. For example, the functionality of some modules may be combined into a single or smaller number of modules, or the functionality of a single module may be distributed across several modules. The modules 214, 216, 218, 220 shown in FIG. 2 will be described in additional detail in association with FIGS. 3 through 6.

Figure 3:
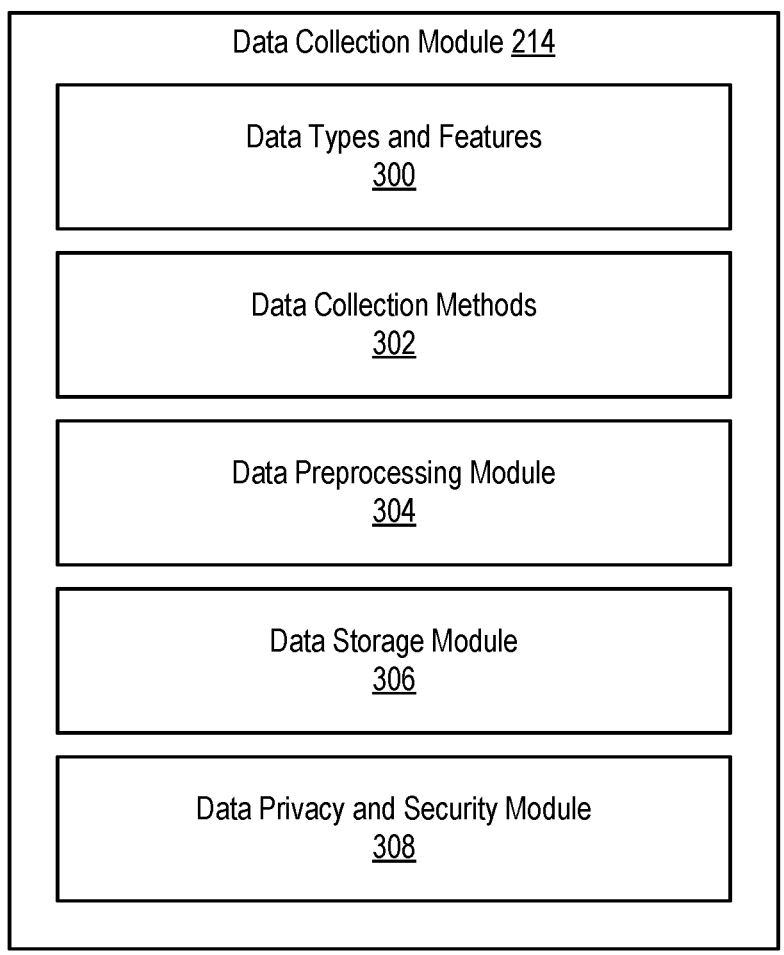
FIG. 3 is a high-level block diagram showing various features and functions that may be incorporated into a data collection module in accordance with the invention.

FIG. 3 is a high-level block diagram showing various features and functions that may be incorporated into a data collection module 214 in accordance with the invention. As shown, data collected by the data collection module 214 may be characterized by various data types and features 300. For example, data collected by the data collection module 214 may include timestamps (e.g., time and date of activities), geolocation (e.g., coordinates, indoor positioning, beacons, etc.), user schedule (e.g., appointments, meetings, reminders, etc.), user roles and responsibilities (e.g., job title, project assignments, team memberships, etc.), task details (e.g., duration, priority, dependencies, deadlines, etc.), communication preferences (e.g., preferred communication channels, availability, accessibility requirements, etc.), and interaction history (e.g., previous interactions with specific environments or tasks).

The data collection module 214 may utilize various different data collection methods 302 when collecting data, including but not limited to application programming interface (API) integrations with corporate systems and IoT systems, direct sensor data collection from environmental sensors 210, and user-generated data inputs, voice commands, feedback, etc. These represent just a few examples and are not intended to be limiting.

A data preprocessing module 304 may be configured to preprocess data that is received by the data collection module 214. This may include, for example, cleaning data such as by addressing inconsistencies, filling in missing values, and/or removing duplicate entries; extracting features such as identifying relevant features from raw data; scaling features such as normalizing and standardizing data; and anonymizing data such as protecting user privacy by removing personally identifiable information.

The data storage module 306 may be configured to store and manage data gathered by the data collection module 214. For example, the data storage module 306 may store data using cloud-based storage solutions (e.g., IBM Cloud, Amazon S3, Google Cloud Storage, etc.), on-premises storage solutions (traditional databases, data lakes, etc.), and/or hybrid storage solutions (e.g., combination of cloud and on-premises storage).

The data privacy and security module 308 may be configured to provide data security and privacy. For example, the data privacy and security module 308 may provide and manage one or more of: encryption for data both in transit and at rest; access control such as role-based access control and/or user authentication; and data retention policies such as defining data storage duration and deletion guidelines.

Figure 4:
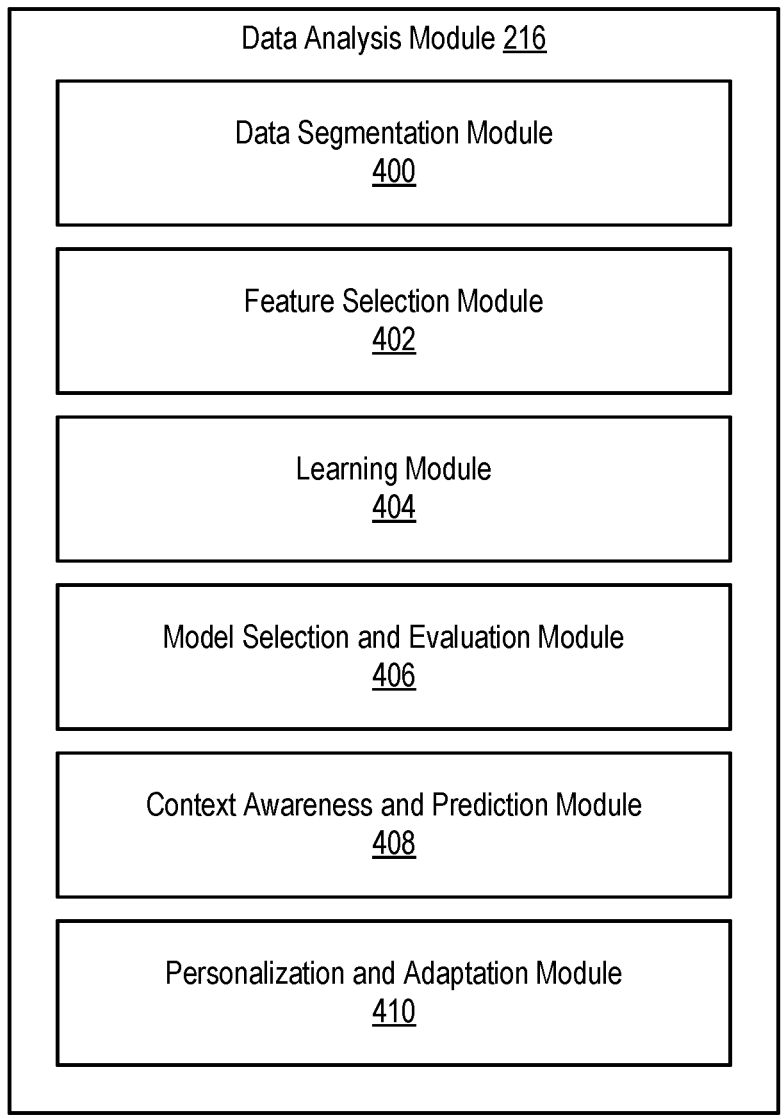
FIG. 4 is a high-level block diagram showing various features and functions that may be incorporated into a data analysis module in accordance with the invention.

FIG. 4 is a high-level block diagram showing various features and functions that may be incorporated into a data analysis module 216 in accordance with the invention. In one embodiment, the data analysis module 216 includes a data segmentation module 400 to provide one or more of temporal segmentation (e.g., grouping data by time intervals such as daily, weekly, monthly, or the like); spatial segmentation (e.g., grouping data by location such in office, home, public spaces, or the like); and contextual segmentation (e.g., grouping data by specific tasks or situations such as meetings, presentations, social interactions, or the like).

The feature selection module 400 may be configured to select a subset of relevant or significant features (input variables or attributes) from a larger set of available features in a dataset. The feature selection module 400 may improve performance of a machine learning model by reducing the dimensionality of data and focusing on the most important and informative features. This may be accomplished using one or more of: filter methods (e.g., correlation coefficients, mutual information, etc.); wrapper methods (e.g., recursive feature elimination, forward and backward feature selection, etc.); and embedded methods (e.g., LASSO, Ridge Regression, etc.).

The learning module 404 may implement machine learning algorithms and techniques to learn patterns and make predictions or decisions based on the data received by the data collection module 214. This may accomplished using one or more of: supervised learning (e.g., decision trees, support vector machines, linear regression, etc.); unsupervised learning (e.g., clustering, dimensionality reduction, etc.); reinforcement learning (e.g., Q-learning, Deep Q-Networks, etc.); ensemble methods (e.g., bagging, boosting, random forests, etc.); and deep learning (e.g., convolutional neural networks, recurrent neural networks, transformers, etc.).

The model selection and evaluation module 406 may be configured to select an ideal combination of hyperparameters and/or model architectures for a particular situation requiring context-aware cues. The model selection and evaluation module 406 may attempt to find a set of parameters that results in the best performance of the machine learning model for a particular task. The model selection and evaluation module 406 may accomplish this, for example, using one or more of: cross-validation (e.g., k-fold, stratified, leave-one-out, etc.); evaluation metrics (e.g., accuracy, precision, recall, F1 score, mean squared error, etc.); and model selection techniques (e.g., grid search, random search, Bayesian optimization, etc.).

The context awareness and prediction module 408 may be configured to predict a next element or value in a sequence based on patterns and relationships observed in historical data. For example, this may be used to determine a next step in an interaction sequence to be performed by a user 222 that is consistent with routine-based tasks and current interactions. The context awareness and prediction module 408 may accomplish this using one or more of: sequence prediction (e.g., Hidden Markov Models, Long Short-Term Memory networks, etc.); context-aware recommender systems (e.g., collaborative filtering, content-based filtering, hybrid methods, etc.); and temporal pattern mining (e.g., frequent pattern mining, sequential pattern mining, etc.).

The personalization and adaptation module 410 may be configured to tailor behavior, responses, or predictions of the model to individual users or changing circumstances. This may create an artificial intelligence system that provides a more relevant and customized experience to users. The personalization and adaptation module 410 may accomplish this using one or more of user profiling which may include extracting user preferences, habits, and patterns from the data; adaptive algorithms which may modify model parameters based on user-specific data; and transfer learning which may leverage knowledge from other users or similar situations to improve predictions.

Figure 5:
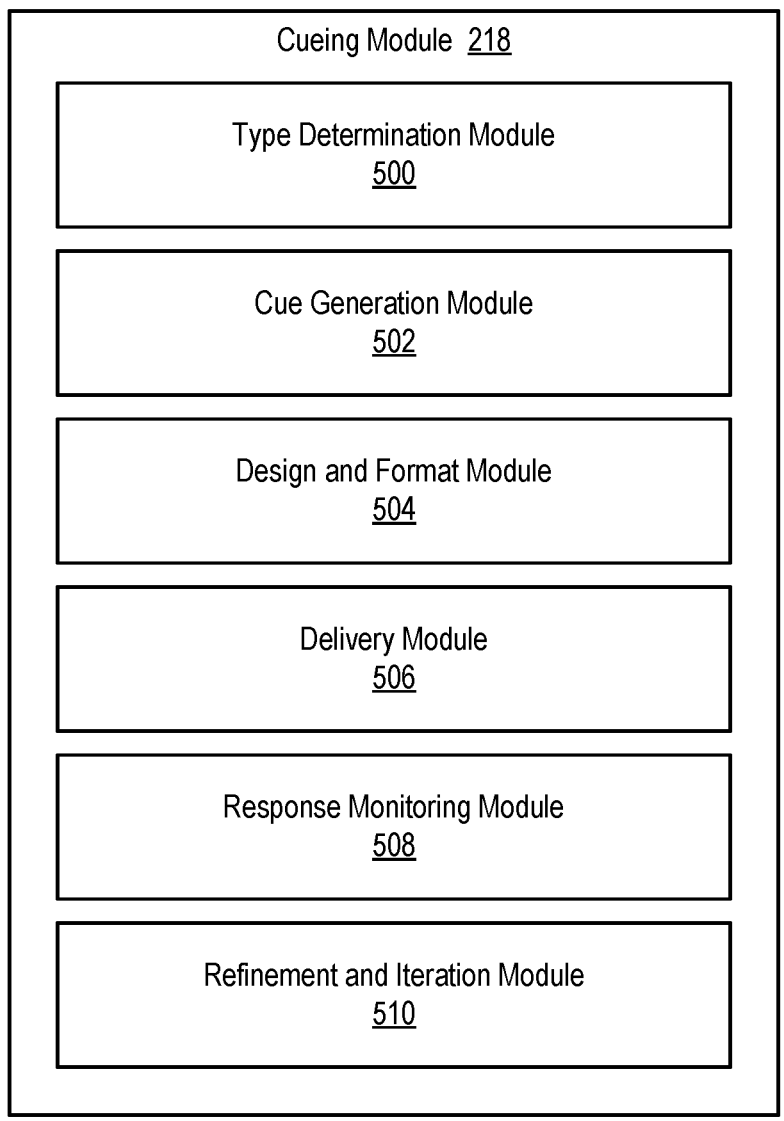
FIG. 5 is a high-level block diagram showing various features and functions that may be incorporated into a cueing module in accordance with the invention.

FIG. 5 is a high-level block diagram showing various features and functions that may be incorporated into a cueing module 218 in accordance with the invention. In general, the cueing module 218 may be configured to provide cues, such as visual, audio, haptic, or other cues to alert users of next steps to perform in an interaction sequence.

In one embodiment, the cueing module 218 includes a type determination module 500 to determine an appropriate cue type. The type determination module 500 may, in certain embodiments, accomplish this by assessing a user's preferences, habits, and/or accessibility requirements and select a cue type (e.g., visual, verbal, haptic, etc.) that best fits the user's needs and environment.

The cue generation module 502 may be configured to utilize the context-aware predictions from the previous stage (i.e., the data analysis module 216) to identify a user's current situation and likely next actions. The cue generation module 502 may then develop tailored cues that provide clear guidance for the user's next step in an interaction sequence.

The design and format module 504 may design and format cues. For visual cues, this may include designing icons, arrows, or other graphical elements that effectively communicate intended guidance. Colors, sizes, and styles may be adjusted based on a user's preferences and accessibility needs. For audio (e.g., verbal) cues, this may include crafting concise and clear spoken instructions or notifications. Natural language processing (NLP) techniques may be used to generate user-friendly and contextually relevant guidance. For haptic cues, this may include determining the most suitable haptic feedback patterns (e.g., vibrations, taps, etc.) to communicate desired guidance effectively and unobtrusively.

The delivery module 506, by contrast, may deliver cues to users. This may include choosing the most appropriate device or medium for delivering the cues (e.g., smartphone, smartwatch, smart glasses, smart speakers, environmental displays, etc.). This may also include ensuring timely delivery of cues and synchronizing them with a user's ongoing activities and interactions.

The response monitoring module 508 may monitor a user's response to cues. This may include tracking a user's response to the provided cues and analyzing their effectiveness in guiding the user to the next step of action. This may also include gathering feedback from the user, either explicitly (e.g., through a rating system or direct input) or implicitly (e.g., by observing the user's actions following the cue).

The refinement and iteration module 510 may be configured to adjust the cues and delivery methods based on a user's response, response time, and feedback. It may continuously refine the cues to enhance their effectiveness in guiding users through their daily interactions and navigation tasks.

Figure 6:
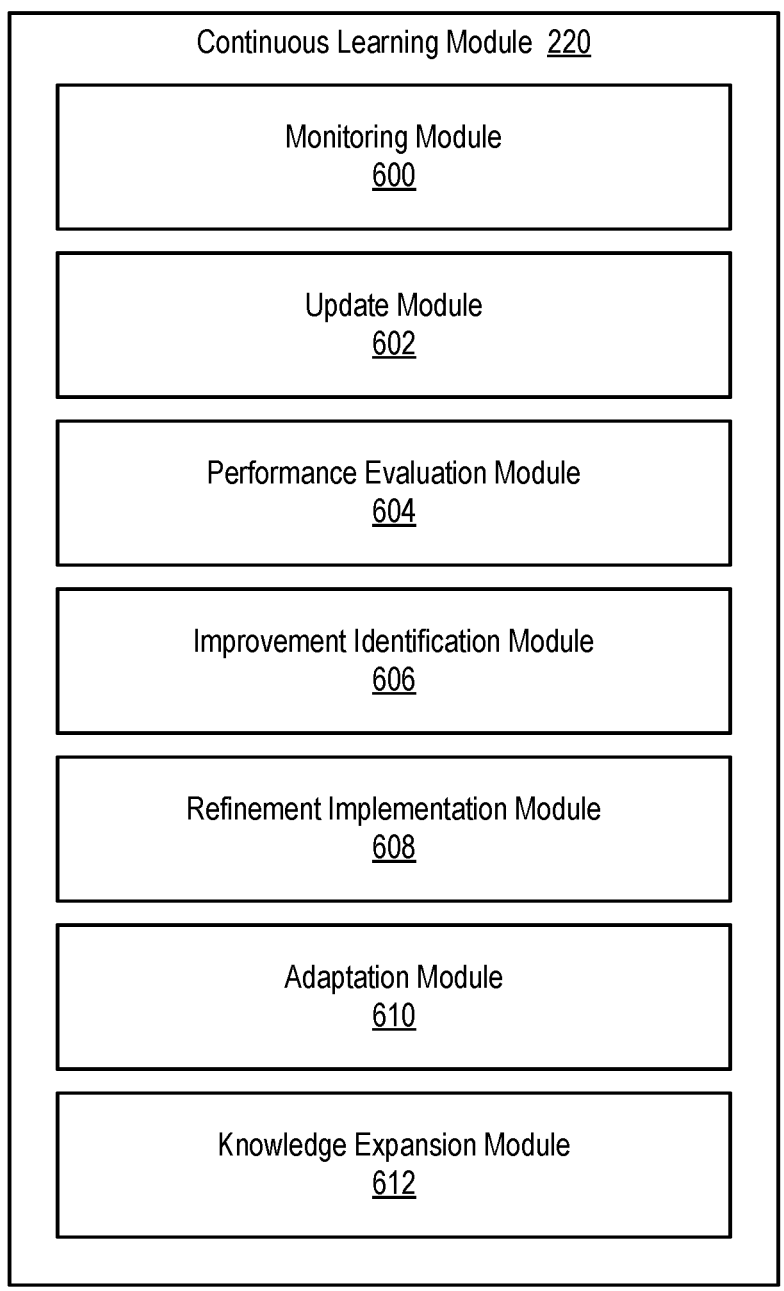
FIG. 6 is a high-level block diagram showing various features and functions that may be incorporated into a continuous learning module in accordance with the invention.

FIG. 6 is a high-level block diagram showing various features and functions that may be incorporated into a continuous learning module 220 in accordance with the invention. As previously discussed, the continuous learning module 220 may continuously refine the system 200 to increase the accuracy of cues as well as continuously adapt to a user's needs and preferences while also expanding the system's knowledge base.

As shown, the continuous learning module 220 may include a monitoring module 600 to monitor changes in user behavior and context. This may include continuously collecting and updating data on users' daily routine-based tasks, environmental interactions, and accomplished tasks. This may also include identifying emerging patterns, trends, and deviations from previous behavior or context.

The update module 602 may update the model with new data detected by the monitoring module 600. This may include incorporating the latest data into the existing model, adjusting parameters and weights as needed. The update module 602 may also retrain the model (i.e., the neural network 203) periodically to account for changes in user behavior, preferences, context, or the like.

The performance evaluation module 604, by contrast, may evaluate model performance. This may include tracking the system's performance in guiding users through daily interactions and navigation tasks. This may also include assessing model performance using evaluation metrics (e.g., accuracy, precision, recall, F1 score, mean squared error, etc.) and user feedback.

The improvement identification module 606 may identify areas for improvement in the model. This may include, for example, analyzing the system's successes and shortcomings, and pinpointing areas where the model may be enhanced or refined. This may also include gathering insights from user feedback, expert input, and comparative analysis with other similar systems.

The refinement implementation model 608 may implement model refinements. This may include modifying machine learning algorithms, techniques, or features used in the model to address identified areas for improvement. The refinement implementation model 608 may also test the updated model to ensure its effectiveness in guiding users through daily interactions and navigation tasks.

The adaptation module 610 may adapt to user-specific needs. More specifically, the adaptation module 610 may personalize the model by tailoring parameters, weights, and features to individual users, in a way that accounts for their unique activities, preferences, and requirements. The adaptation module 610 may also leverage transfer learning techniques to accelerate model adaptation for new users or contexts, using insights from other users or similar situations.

The knowledge expansion module 612 may expand a knowledge corpus associated with the model. For example, the knowledge expansion module 612 may collect and store successful guided interactions and user feedback in a structured knowledge base. The knowledge expansion module 612 may use this knowledge corpus to inform future refinements and adaptations, thereby enriching the system's understanding of users' needs and preferences over time.

Figure 7:
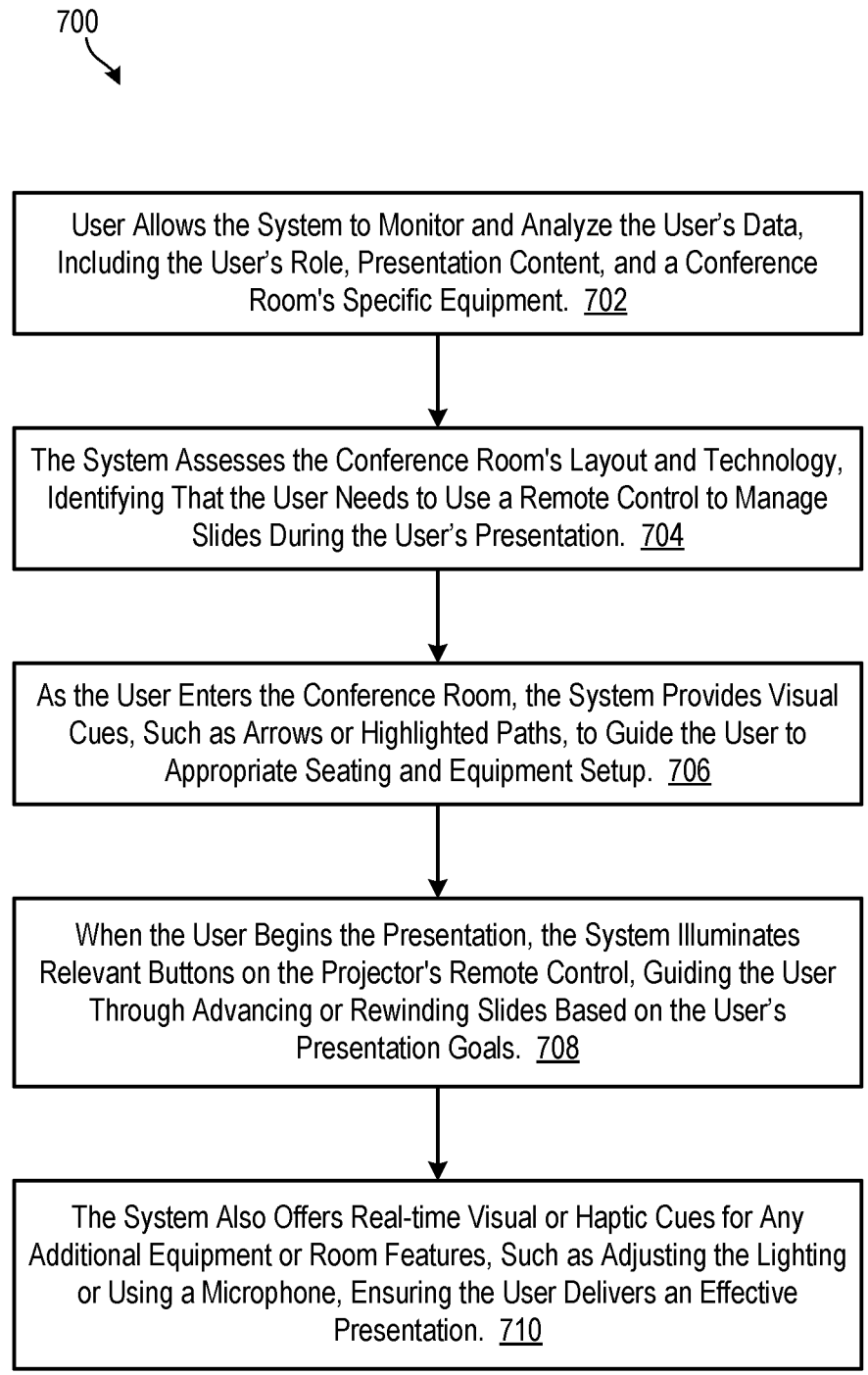
FIG. 7 is a process flow diagram showing a first exemplary use case using a system and method in accordance with the invention.

Referring to FIG. 7, a process flow diagram showing a first exemplary use case (i.e., conference room navigation) using a system 200 in accordance with the invention is illustrated. In this use case, a user, namely a marketing manager at a company, is scheduled to deliver a presentation in an unfamiliar conference room. The user opts to utilize a system 200 in accordance with the invention to assist her in navigating the new environment and technology.

As shown in FIG. 7, the user allows 702 the system 200 to monitor and analyze the user's data, including, for example, the user's role, presentation content, and a conference room's specific equipment. The system 200 assesses 704 the conference room's layout and technology, identifying that the user needs to use a remote control to manage slides during the user's presentation. As the user enters the conference room, the system 200 provides 706 visual cues, such as arrows or highlighted paths, to guide the user to appropriate seating and equipment setup. When the user begins the presentation, the system 200 illuminates 708 relevant buttons on a projector's remote control to guide the user through advancing or rewinding slides based on the user's presentation goals. The system 200 may also provide 710 real-time visual or haptic cues for any additional equipment or room features, such as adjusting the lighting or using a microphone, to ensure the user delivers an effective presentation.

In this use case, the system 200 beneficially provides simplified navigation and usage of unfamiliar conference rooms and technology. The system 200 also provides tailored visual cues to guide users through equipment setup and presentation delivery. The system 200 provides increased confidence and efficiency for presenters in new environments.

Figure 8:
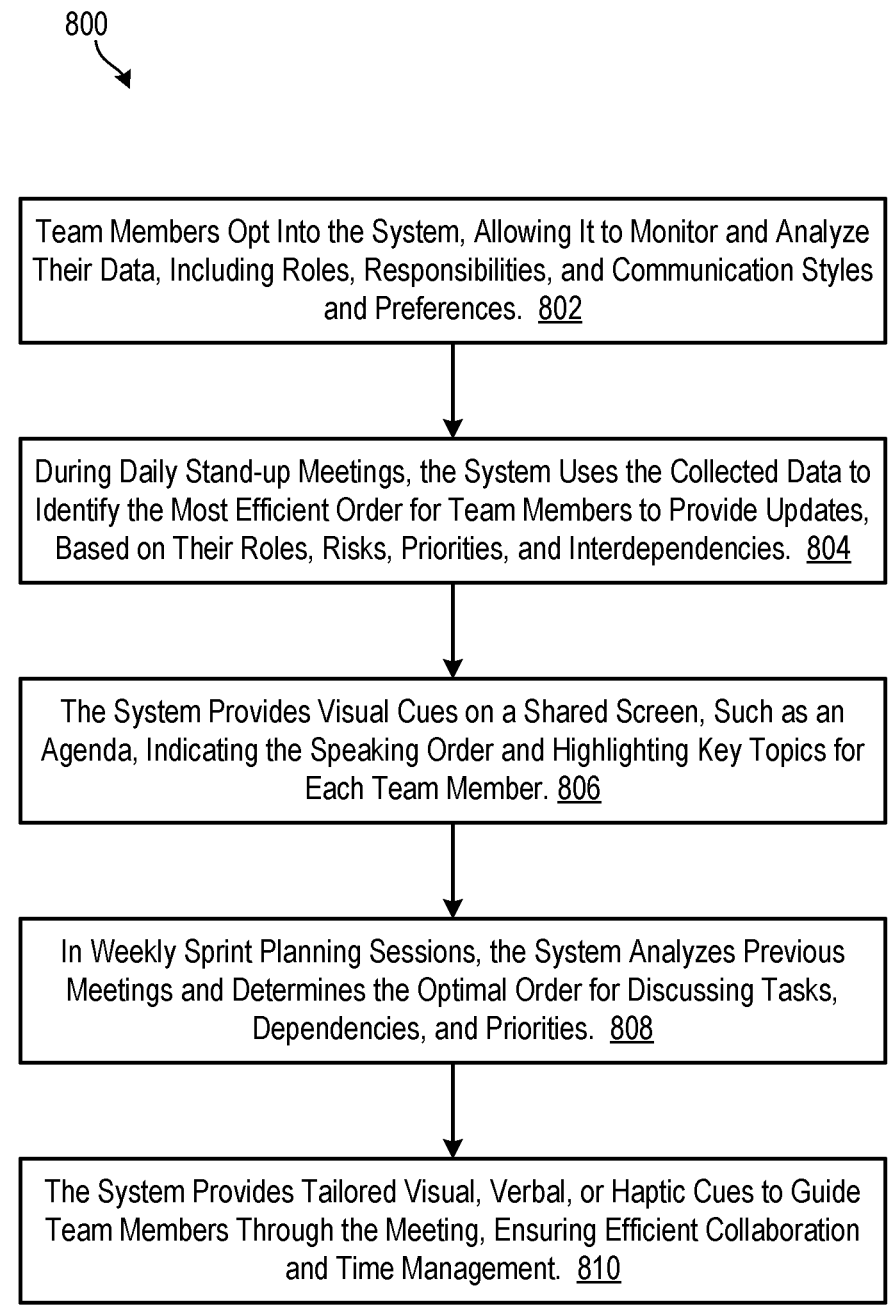
FIG. 8 is a process flow diagram showing a second exemplary use case using a system and method in accordance with the invention.

Referring to FIG. 8, a process flow diagram showing a second exemplary use case using a system 200 in accordance with the invention is illustrated. In this use case, a team of employees at a tech company uses a system 200 in accordance with the invention to enhance collaboration during daily stand-up meetings and weekly sprint planning sessions.

As shown in FIG. 8, team members opt into the system 200, thereby enabling it to monitor 802 and analyze 802 their data, including roles, responsibilities, and communication styles and preferences. During daily stand-up meetings, the system 200 uses 804 the collected data to identify the most efficient order for team members to provide updates based on their roles, risks, priorities, and interdependencies. The system 200 provides 806 visual cues on a shared screen, such as an agenda, indicating the speaking order and highlighting key topics for each team member. In weekly sprint planning sessions, the system 200 analyzes 808 previous meetings and determines 808 the optimal order for discussing tasks, dependencies, and priorities. The system 200 provides 810 tailored visual, verbal, or haptic cues to guide team members through the meeting, thereby ensuring efficient collaboration and time management.

In this use case, the system 200 beneficially provides improved efficiency during daily stand-up meetings and weekly sprint planning sessions. The system 200 provides tailored visual cues to guide team members through updates and discussions. The system 200 provides enhanced collaboration and focus among team members with diverse roles and responsibilities.

Figure 9:
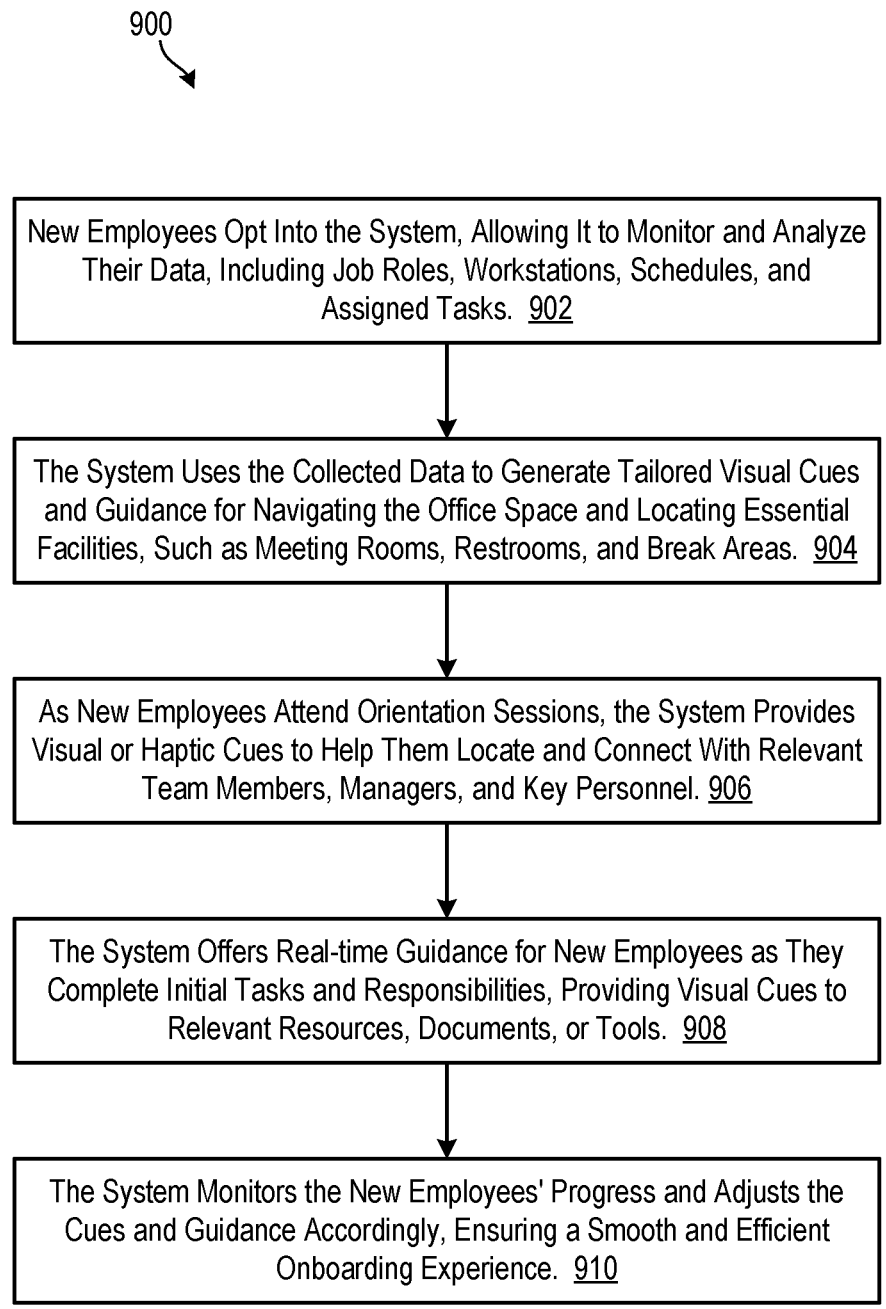
FIG. 9 is a process flow diagram showing a third exemplary use case using a system and method in accordance with the invention.

Referring to FIG. 9, a process flow diagram showing a third exemplary use case using a system 200 in accordance with the invention is illustrated. In this use case, a large corporation uses the system 200 to improve an onboarding process for new employees to ensure that they quickly adapt to their new work environment and responsibilities.

As shown in FIG. 9, new employees opt 902 into the system 200 to enable it to monitor and analyze their data, including job roles, workstations, schedules, assigned tasks, etc. The system 200 uses 904 the collected data to generate tailored visual cues and guidance for navigating the office space and locating essential facilities, such as meeting rooms, restrooms, and break areas. As new employees attend orientation sessions, the system 200 provides 906 visual or haptic cues to help the employees locate and connect with relevant team members, managers, and key personnel. The system 200 offers 908 real-time guidance for new employees as they complete initial tasks and responsibilities, providing visual cues to relevant resources, documents, or tools. The system 200 monitors 910 the new employees' progress and adjusts 910 the cues and guidance accordingly, ensuring a smooth and efficient onboarding experience.

In this use case, the system 200 beneficially expedites an onboarding process for new employees to reduce time required to reach full productivity. The system 200 tailors visual cues and guidance for navigating the office space and locating essential facilities. The system 200 also beneficially provides real-time assistance with initial tasks and responsibilities to ensure a smooth transition with improved confidence and assurance while integrating into a new work environment.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method implemented by one or more processors, the method comprising:
receiving, by a neural network, routine data describing routine-based tasks associated with a user;
receiving, by the neural network, interaction data describing current interactions of the user in a particular environment;
training, by the neural network, a machine learning model based on the routine data and the interaction data;
monitoring, by the neural network, changes in user behavior and context;
pre-processing, by the neural network, the routine data and interaction data, wherein pre-processing includes, at least, cleaning data inconsistencies, filling in missing values in the data, removing duplicate entries, extracting features from raw data, scaling features and anonymizing data;
re-training, by the neural network, the machine learning model based on changes in the user behavior and context;
processing the machine learning model, by the neural network, the routine data, changes in the user behavior and the interaction data to determine a next step to be performed by the user that is consistent with the routine-based tasks and the current interactions; and
providing a cue to the user to perform the next step in the particular environment based on the machine learning model.

2. The method of claim 1, wherein the cue is a visual cue.

3. The method of claim 1, wherein the cue is an auditory cue.

4. The method of claim 1, wherein the cue is a haptic cue.

5. The method of claim 1, wherein the routine-based tasks are determined using at least one of a schedule of the user, roles and responsibilities of the user, tasks performed by the user, communication preferences of the user, an interaction history of the user, geolocation data associated with the user, and timestamps associated with the user.

6. The method of claim 1, wherein the current interactions are determined by gathering data from at least one of mobile devices, IoT devices, environmental sensors, user feedback, and corporate systems.

7. The method of claim 1, further comprising continuously refining the neural network to increase an accuracy of the cue.

8. A computer program product comprising a computer-readable storage medium having computer-usable program code embodied therein, the computer-usable program code configured to perform the following when executed by at least one processor:
receive, by a neural network, routine data describing routine-based tasks associated with a user;
receive, by the neural network, interaction data describing current interactions of the user in a particular environment;
train, by the neural network, a machine learning model based on the routine data and the interaction data;
monitor, by the neural network, changes in user behavior and context;
pre-process, by the neural network, the routine data and interaction data, wherein pre-processing includes, at least, cleaning data inconsistencies, filling in missing values in the data, removing duplicate entries, extracting features from raw data, scaling features and anonymizing data;
re-train, by the neural network, the machine learning model based on changes in the user behavior and context;
process the machine learning model, by the neural network, the routine data, changes in the user behavior and the interaction data to determine a next step to be performed by the user that is consistent with the routine-based tasks and the current interactions; and provide a cue to the user to perform the next step in the particular environment based on the machine learning model.

9. The computer program product of claim 8, wherein the cue is a visual cue.

10. The computer program product of claim 8, wherein the cue is an auditory cue.

11. The computer program product of claim 8, wherein the cue is a haptic cue.

12. The computer program product of claim 8, wherein the routine-based tasks are determined using at least one of a schedule of the user, roles and responsibilities of the user, tasks performed by the user, communication preferences of the user, an interaction history of the user, geolocation data associated with the user, and timestamps associated with the user.

13. The computer program product of claim 8, wherein the current interactions are determined by gathering data from at least one of mobile devices, IoT devices, environmental sensors, user feedback, and corporate systems.

14. The computer program product of claim 8, wherein the computer-usable program code is further configured to continuously refine the neural network to increase an accuracy of the cue.

15. A system comprising:
at least one processor; and
at least one memory device operably coupled to the at least one processor and storing instructions for execution on the at least one processor, the instructions causing the at least one processor to:
receive, by a neural network, routine data describing routine-based tasks associated with a user;
receive, by the neural network, interaction data describing current interactions of the user in a particular environment;
train, by the neural network, a machine learning model based on the routine data and the interaction data;
monitor, by the neural network, changes in user behavior and context;
pre-process, by the neural network, the routine data and interaction data, wherein pre-processing includes, at least, cleaning data inconsistencies, filling in missing values in the data, removing duplicate entries, extracting features from raw data, scaling features and anonymizing data;
re-train, by the neural network, the machine learning model based on changes in the user behavior and context;
process the machine learning model, by the neural network, the routine data, changes in the user behavior and the interaction data to determine a next step to be performed by the user that is consistent with the routine-based tasks and the current interactions; and
provide a cue to the user to perform the next step in the particular environment based on the machine learning model.

16. The system of claim 15, wherein the cue is a visual cue.

17. The system of claim 15, wherein the cue is at least one of an auditory cue and a haptic cue.

18. The system of claim 15, wherein the routine-based tasks are determined using at least one of a schedule of the user, roles and responsibilities of the user, tasks performed by the user, communication preferences of the user, an interaction history of the user, geolocation data associated with the user, and timestamps associated with the user.

19. The system of claim 15, wherein the current interactions are determined by gathering data from at least one of mobile devices, IoT devices, environmental sensors, user feedback, and corporate systems.

20. The system of claim 15, wherein the instructions further cause the at least one processor to continuously refine the neural network to increase an accuracy of the cue.

* * * * *